United States Patent
Kayahara et al.

(10) Patent No.: US 7,266,554 B2
(45) Date of Patent: Sep. 4, 2007

(54) DOCUMENT EXTRACTING DEVICE, DOCUMENT EXTRACTING PROGRAM, AND DOCUMENT EXTRACTING METHOD

(75) Inventors: Naoki Kayahara, Chino (JP); Hirotaka Ohashi, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 469 days.

(21) Appl. No.: 10/731,164

(22) Filed: Dec. 10, 2003

(65) Prior Publication Data

US 2004/0167888 A1   Aug. 26, 2004

(30) Foreign Application Priority Data

Dec. 12, 2002   (JP)   ............... 2002-360984

(51) Int. Cl.
*G06F 7/00*   (2006.01)
(52) U.S. Cl. ........................................ 707/7
(58) Field of Classification Search ............... 707/10, 707/7
See application file for complete search history.

(56) References Cited

U.S. PATENT DOCUMENTS

| | | | | |
|---|---|---|---|---|
| 6,167,398 | A | * | 12/2000 | Wyard et al. ............... 707/5 |
| 6,615,209 | B1 | * | 9/2003 | Gomes et al. ............... 707/5 |
| 6,941,321 | B2 | * | 9/2005 | Schuetze et al. ........ 707/103 R |
| 2002/0143737 | A1 | * | 10/2002 | Seki et al. ................. 707/1 |
| 2003/0074369 | A1 | * | 4/2003 | Schuetze et al. ........ 707/103 R |

FOREIGN PATENT DOCUMENTS

| JP | 9-96418 | 4/1997 |
|---|---|---|
| JP | A-09-231238 | 9/1997 |
| JP | A 10-275160 | 10/1998 |
| JP | 2000-148770 | 5/2000 |
| JP | A-2001-273302 | 10/2001 |

* cited by examiner

*Primary Examiner*—Don Wong
*Assistant Examiner*—Angela M Lie
(74) *Attorney, Agent, or Firm*—Oliff & Berridge, PLC

(57) ABSTRACT

To provide a document extracting device, a document extracting program, and a document extracting method, having a low cost and a small amount of computation required to extract documents, a document extracting device includes similarity computing device computing all degrees of similarity between a plurality of documents to be candidates for extraction, and document extracting device to extract a combination of documents whose sum of the degrees of similarity between the documents computed by the similarity computing device is the smallest when any number of documents are extracted from among a group of the documents. As a result, since the cost required for works of giving keywords to the respective documents is not required to extract the documents, and even when the number of documents is increased, the amount of computation required to extract the documents is not increased extremely.

8 Claims, 7 Drawing Sheets

DOCUMENT EXTRACTING DEVICE, DOCUMENT EXTRACTING PROGRAM, AND DOCUMENT EXTRACTING METHOD

BACKGROUND OF THE INVENTION

1. Field of Invention

The present invention relates to a document delivery system to automatically deliver documents, such as news, in accordance with a user's taste, and specifically, to a document extracting device to exclude documents having similar content from many candidate documents for delivery and extracting only unique documents, a document extracting program, and a document extracting method.

2. Description of Related Art

Generally, in a related art information delivery system capable of being customized for each user, a user sets up a filtering condition, and a computer automatically extracts documents only corresponding to the set-up filtering condition from various information segments (hereinafter, referred to as documents including character information as their major element), such as news delivered in real time, so as to deliver the documents to the user.

In such a related art document delivery system, problems occur wherein the documents to be delivered are too biased depending on the filtering condition, or documents having similar contents are delivered repeatedly. In particular, in the latter problem, since the contents of documents are duplicated, more and more useless information segments are included in the delivered information, or when spaces to carry the documents are limited, other important documents are cut off disadvantageously, thereby seriously damaging convenience or reliability of the document delivery system itself.

For this reason, in order to reduce or prevent such delivery of duplicated documents, a filtering or classification technology to efficiently extract only necessary documents is considered very important. As in the related art, for example, technologies as shown in Japanese Patent No. 3203203 and Japanese Unexamined Patent Application Publication No. 10-275160 described below are suggested.

First, in Japanese Patent No. 3203203, a technology of giving keywords to all documents, making the documents into vectors by using the keywords, introducing a similarity-evaluating criteria to take a maximum value when any document A is included in another document B, and recognizing representative documents, dependent documents and independent documents to collect documents having proper relations together, is disclosed.

On the other hand, in Japanese Unexamined Patent Application Publication No. 10-275160, a technology of computing distinctive quantities of documents to be classified, obtaining the degrees of similarity of the amount of characteristics, and then classifying the documents using a mathematical and statistical cluster analysis, is disclosed.

In the former related art, it is necessary to give characteristic, such as keywords, to all documents, but the task of giving the keywords to all documents is expensive. However, the cluster analysis used in the latter related art is an analysis method suitable for hierarchical classification or grouping. However, the amount of computation increases extremely as the number of documents increases, which creates a problem of a serious decrease in throughput.

SUMMARY OF THE INVENTION

Therefore, the present invention is contrived to address the above problems of the related art. The present invention provides a document extracting device, a document extracting program, and a document extracting method having a low cost and a small amount of computation required to extract documents.

In order to accomplish the above, a document extracting device of a first aspect of the invention includes: a similarity computing device to acquire a plurality of documents to be candidates for extraction and computing all degrees of similarity between the documents; and a document extracting device to extract a combination of documents whose sum of the degrees of similarity between the documents computed by the similarity computing device is the smallest when any number of documents are extracted from among a group of the documents.

By employing the above construction, since the documents having a large degree of similarity are not selected together when several documents are extracted from among a plurality of documents to be candidates for extraction, it is possible to considerably decrease a possibility of repeatedly extracting documents having similar contents. Further, since work of giving keywords to the respective documents is not required to extract documents, cost required for such work is unnecessary. Furthermore, since the combination of documents is extracted on the basis of the sum of the degrees of similarity between the documents, even when the number of documents increases, the amount of computation does not increase extremely.

Further, in a document extracting device of a second aspect of the invention, the similarity computing device includes: a character-string-dividing functional unit to divide each of the documents into predetermined character strings; a character-string frequency computing functional unit to compute document vectors of the documents on the basis of the frequency of appearance of the character strings divided by the character-string-dividing functional unit; and a mutual similarity computing functional unit to compute the degrees of similarity between the documents on the basis of the document vectors obtained from the character-string frequency computing functional unit.

By employing the above construction, since the degrees of similarity between the documents can be accurately computed, advantages of the first aspect of the invention can be surely accomplished.

Furthermore, in a document extracting device of a third aspect of the invention, the character-string-dividing functional unit divides each of the documents into predetermined character strings using any one of character string division methods, such as a morphological analysis method, an n-gram method, a stop-word method, and a stemming method.

That is, since the character string division methods, such as a morphological analysis method, an n-gram method, and a stop-word method have been widely used in the related art and excellent in reliability, it is possible to accurately divide each of the documents into the character strings by using the methods as the character-string-dividing functional unit of an aspect of the present invention, and to cope with various types of documents by using any one of several methods.

Furthermore, in a document extracting device of a fourth aspect of the invention, the character-string frequency computing functional unit generates document vectors of the documents weighted by a TFIDF on the basis of the frequency of appearance of the divided character strings.

That is, when the document vectors of the documents are generated, the frequency of appearance of the divided character strings may be used as it is, and in addition, if a well-known weighting method of reflecting the importance of the character strings, referred to as TFIDF to be described later, is used, it is possible to generate document vectors representing features of the documents well.

Furthermore, in a document extracting device of a fifth aspect of the invention, the mutual similarity computing functional unit computes the degrees of similarity between the documents by a vector space method on the basis of the document vectors of the documents.

That is, since the degree of similarity between two vectors can be quantitatively expressed as a cosine value (0 to 1) of an angle formed by two vectors using the vector space method as a method to compute degree of similarity between the documents, it is possible to more accurately perform the successive extraction of documents.

A document extracting program of a sixth aspect of the invention allows a computer to serve as: a similarity computing device to acquire a plurality of documents to be candidates for extraction and computing all degrees of similarity between the documents; and a document extracting device to extract a combination of documents whose sum of the degrees of similarity between the documents computed by the similarity computing device is the smallest when any number of documents are extracted from among a group of the documents.

Accordingly, when each of the aforementioned devices are implemented, an inexpensive all-purpose personal computer can be used as is by software without preparation of any exclusive hardware, which can considerably reduce the cost required for the implementation or time required until the implementation.

Further, in a document extracting program of a seventh aspect of the invention, the similarity computing device is embodied by: a character-string-dividing function to divide each of the documents into predetermined character strings; a character-string frequency computing function to compute document vectors of the documents on the basis of the frequency of appearance of the character strings divided by the character-string-dividing function; and a mutual similarity computing function to compute the degrees of similarity between the documents on the basis of the document vectors obtained by the character-string frequency computing function.

As a result, similarly to the second aspect of the invention, it is possible to accurately compute the degrees of similarity between the documents by software.

Furthermore, in a document extracting program of an eighth aspect of the invention, the similarity computing device is embodied by: a character-string-dividing function to divide each of the documents into character strings using any one of character string division methods, such as a morphological analysis method, an n-gram method, a stop-word method, and a stemming method; a character-string frequency computing function to generate document vectors obtained by weighting each of the documents by TFIDF on the basis of the frequency of appearance of the divided character strings; and a mutual similarity computing function to compute the degrees of similarity between the documents by a vector space method on the basis of the document vectors of the documents.

Accordingly, it is possible to accomplish operation and advantages similar to the third to fifth aspects of the inventions by software.

In a document extracting method of a ninth aspect of the invention, a plurality of documents to be candidates for extraction is acquired, all degrees of similarity between the documents are computed, and when any number of documents are extracted from among a group of the documents, a combination of documents whose sum of the degrees of similarity between the documents is the smallest is extracted.

As a result, similar to the document extracting device of the first aspect of the invention, it is possible to considerably decrease a possibility of repeatedly extracting documents having similar (duplicated) contents, and simultaneously, to reduce the cost required for the document extracting process, so that even when the number of documents increases, the amount of computation does not increase extremely.

Furthermore, in a document extracting method of a tenth aspect of the invention, each of the documents is divided into predetermined character strings, the frequency of appearance of the divided character strings is computed, document vectors of the documents are computed on the basis of the frequency of appearance of the character strings, and then the degrees of similarity between the documents to be candidates for extraction are computed using the document vectors.

Accordingly, similar to the second aspect of the invention, it is possible to accurately compute the degrees of similarity between the documents.

Furthermore, in a document extracting method of an eleventh aspect of the invention, each of the documents is divided into predetermined character strings using any one of character string division methods, such as a morphological analysis method, an n-gram method, a stop-word method and a stemming method, document vectors of the documents are computed by TFIDF on the basis of the frequency of appearance of the divided character strings, and the degrees of similarity between the documents to be candidates for extraction are computed using a vector space method on the basis of the document vectors.

As a result, the same operation and advantages as the third to fifth aspects of the invention can be accomplished.

DETAILED DESCRIPTION OF EXEMPLARY EMBODIMENTS

Now, exemplary embodiments of the present invention will be described in detail with reference to the appended figures.

Figure 1:
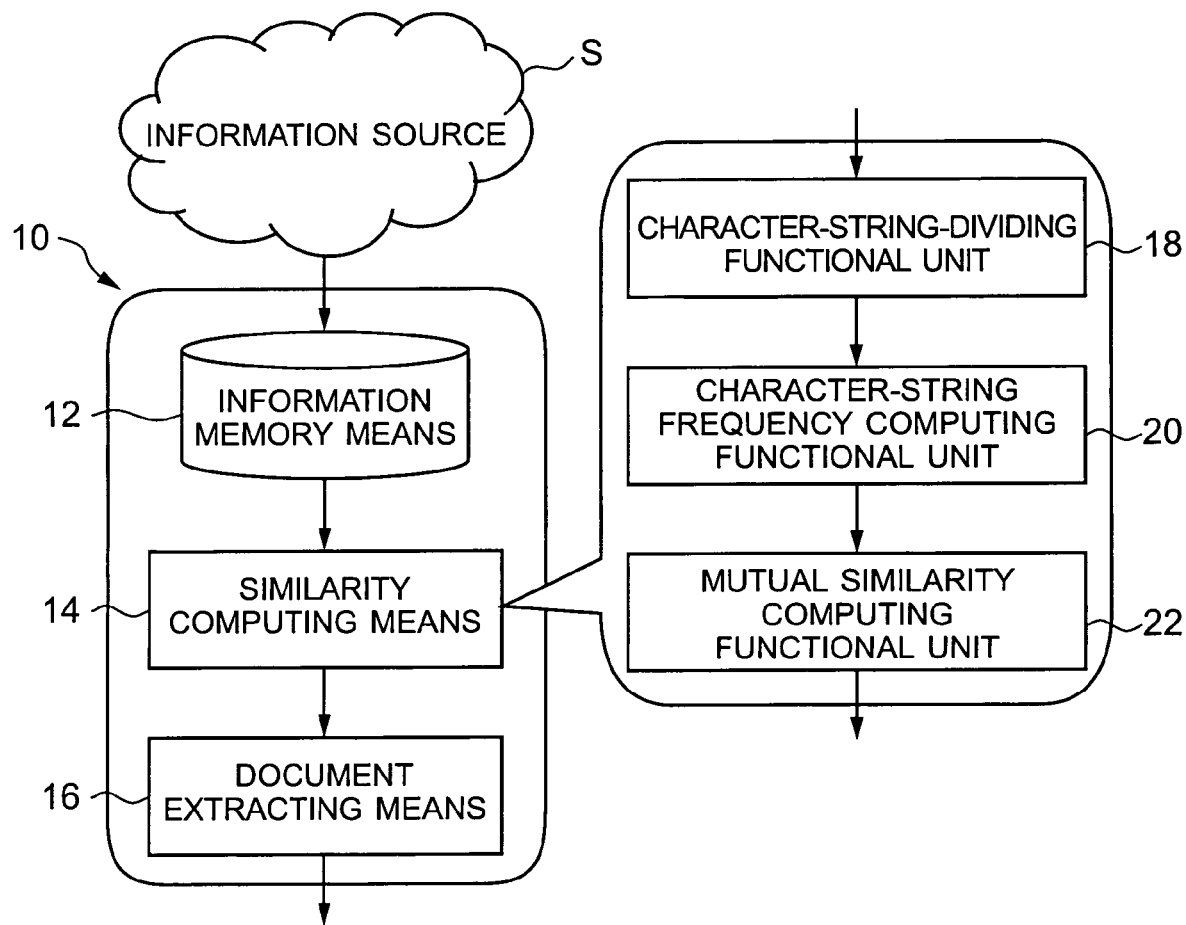
FIG. 1 is a block schematic illustrating a configuration of a document extracting device.

First, FIG. 1 illustrates an example of a document extracting device 10 according to an aspect of the present invention. The document extracting device 10 mainly includes information memory device 12 to temporarily store several pieces of information supplied from an information source S in an information network, such as the internet, as individual documents, similarity computing device 14 to collectively acquire a plurality of documents stored in the information memory device 12 and computing the degrees of similarity between the documents, and document extracting device 16 to extract only several documents from among a group of the documents on the basis of the degrees of similarity between the documents obtained by the similarity computing device 14.

As shown in the figure, the similarity computing device 14 includes a character-string-dividing functional unit 18, a character-string frequency computing functional unit 20, and a mutual similarity computing functional unit 22. As described later in detail, the character-string-dividing functional unit 18 divides each of the documents acquired from the information memory device 12 into character strings, the character-string frequency computing functional unit 20 computes the frequency of appearance of each of the divided character strings to compute vectors of the documents, and then the mutual similarity computing functional unit 22 computes degrees of mutual similarity between the document vectors of the documents obtained by the character-string frequency computing functional unit 20 to obtain data thereof.

Figure 2:
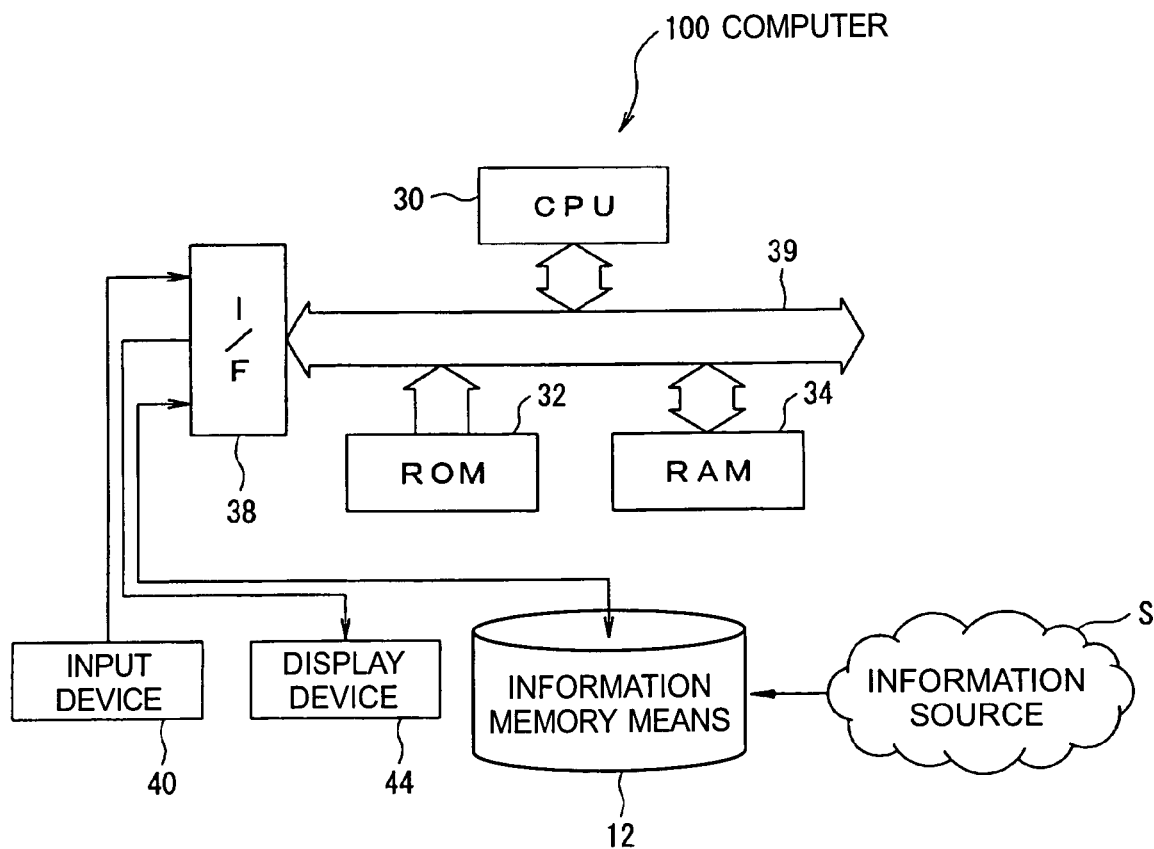
FIG. 2 is a block schematic illustrating a configuration of a computer.

Specifically, the document extracting device 10 is embodied by a computer 100 constructed as shown in FIG. 2.

As shown in the figure, the computer 100 includes a CPU 30 to control operation and a whole device on the basis of a control program, a ROM 32 to previously store the control program of the CPU 30 in a predetermined area thereof, a RAM 34 to store data read out from the ROM 32, etc. and operation results required for operation by the CPU 30, and an I/F 38 to interface the input/output of data with external devices. They are mutually and data-transferably connected through a bus 39, which is a signal line to transmit data.

As external devices, an input device 40, such as a keyboard or a mouse capable of inputting data, a display device 44 to display an image on the basis of image signals, and the information memory device 12 to temporarily store information, as described above, supplied from the information source S as predetermined document data are connected to the I/F 38. The information memory device 12 is an external memory unit, such as a hard disk, and is regularly or occasionally supplied with predetermined information from the information source S, such as the Internet.

The CPU 30 includes a micro processing unit (MPU), etc., starts a document extracting program stored in a predetermined area of the ROM 32, and time-divisionally executes processing corresponding to the similarity computing device 14 and processing corresponding to the document extracting device 16 in accordance with the document extracting program.

Now, operation of this exemplary embodiment will be described.

As shown in FIG. 1, first, documents corresponding to a user's taste are regularly or irregularly supplied from the information source S to the information memory device 12 and temporarily stored therein, and when the number of documents reaches a predetermined number or after predetermined storage time, all the stored documents are once sent to the similarity computing device 14, where the degrees of similarity between the documents are computed.

Figure 3:
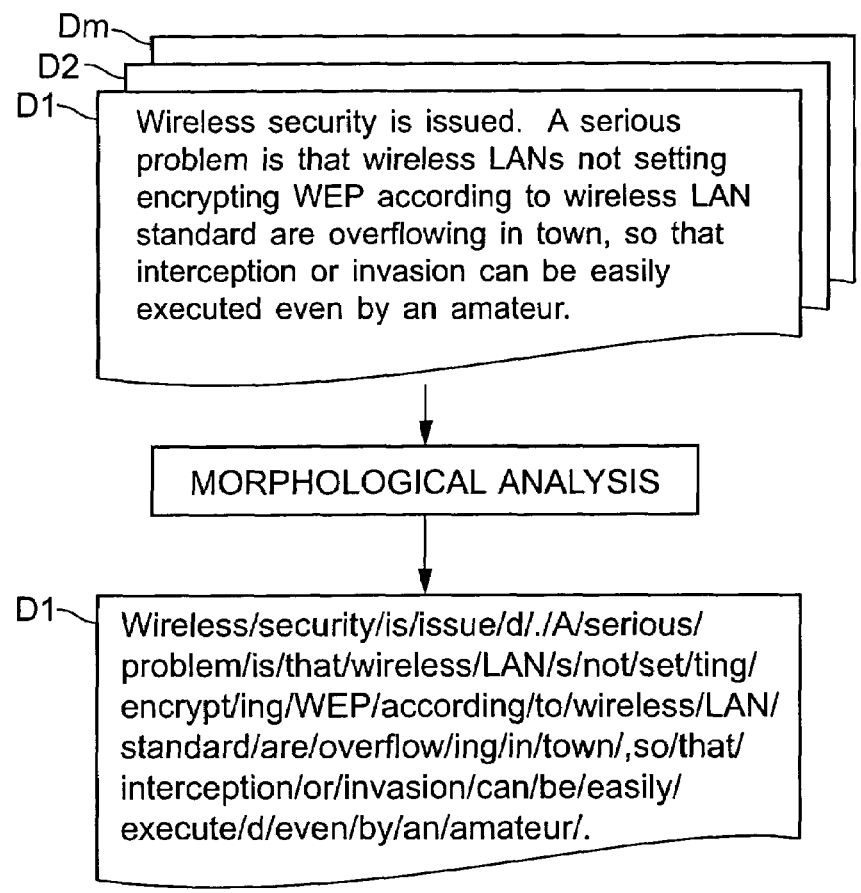
FIG. 3 is a view illustrating an example of a character string division using a morphological analysis.

That is, each of the documents sent to the similarity computing device 14 is first divided into character strings by the character-string-dividing functional unit 18. This character string division method (technique) is not specifically limited, and when the documents $D_1$ to $D_m$ are divided into character strings using a stemming method as shown in FIG. 3, the documents can be divided into character strings (words) using grammatical separation with reference to a morphological analysis dictionary. Herein, the morphological analysis can include various techniques, and the result thereof varies depending upon the quality of a dictionary. For example, [Wireless/security/is/issue/d./A/serious/problem/is/that/wireless/LAN/s/not/set/ting/encrypt/ing/WEP /according/to/wireless/LAN/standard/are/overflow/ing/in/ town/, so/that/interception/or/invasion/can/be/easily/execute/d/even/by/an/amateur/.] in FIG. 3, the documents can be divided into words such as nouns, verbs, adjectives, auxiliary words, and auxiliary verbs. On the other hand, the morphological analysis has an excellent accuracy of division, but previously had a disadvantage that required much cost to prepare or maintain the dictionary in order to keep the accuracy. However, since the dictionaries having been made for many years can be recently used as a resource and the problem of cost is thus gradually solved, the morphological analysis is a character string division method that is most frequently used. However, since the morphological analysis can be used only in Japanese, there is a disadvantage that it cannot be used in other languages, such as English or Chinese.

Figure 4:
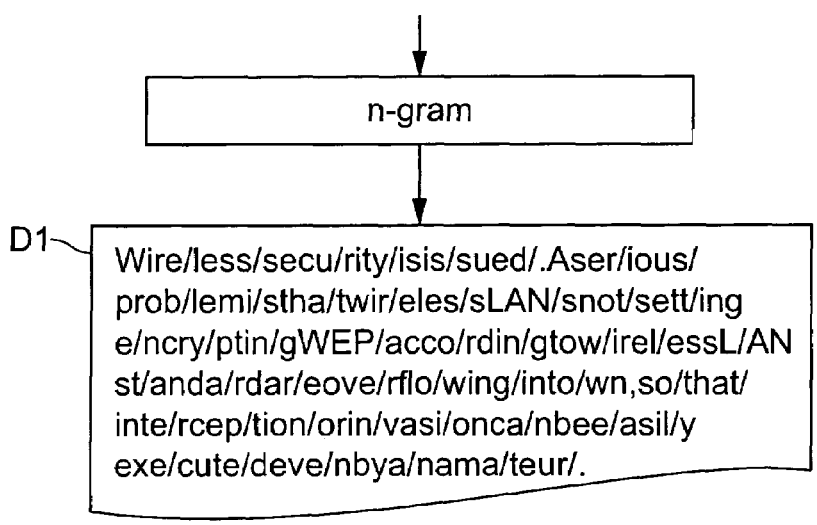
FIG. 4 is a view illustrating an example of a character string division using an n-gram.

The documents $D_1$ to $D_m$ may be divided into character strings using a character string division method referred to as n-gram of separating a document into character strings for every predetermined interval instead of the morphological analysis. Using the n-gram method, the documents are divided as shown in FIG. 4. That is, "n" in the n-gram is a numerical character indicating every how many bytes (or every how many characters) a document is divided, and since a document is divided every 4 characters in FIG. 4, it can be written as 4-gram. However, in case of a two-byte character set, as in Japanese, since 2 characters equals 4 bytes, it may be written as 4-gram. But the correctness of the numerical character does not matter here. In the n-gram, it is difficult to divide a meaningful word as a cluster, but when the divided character strings are statistically processed as they are, a meaningful word does not always have to be a cluster. Further, since the n-gram has a simpler algorithm than that of the morphological analysis, there is a merit that the n-gram can be used in any language.

Figure 5:
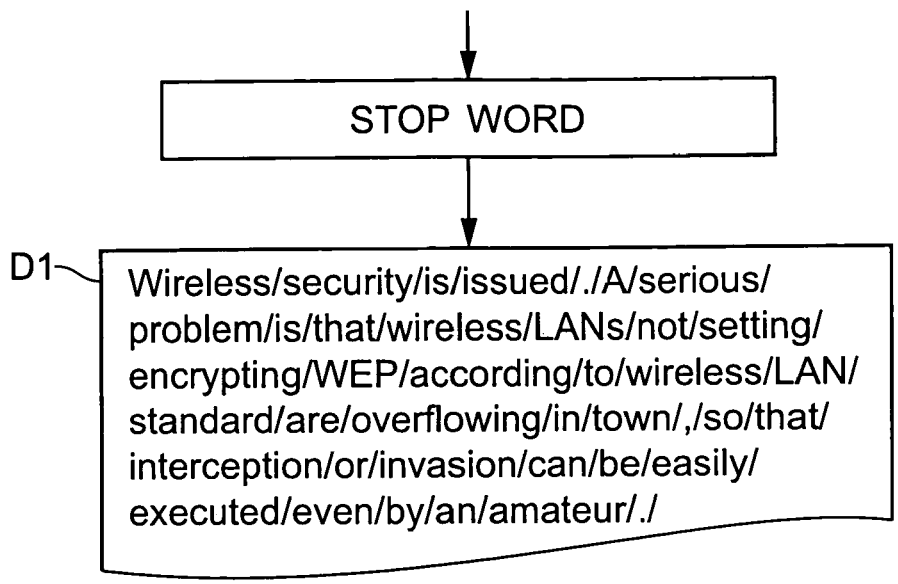
FIG. 5 is a view illustrating an example of a character string division using a stop word.

Further, as another character string division method, a stop-word method may be used as shown in FIG. 5. In the stop-word method, characters or rules to divide a document are registered, and the document is divided in accordance with the characters or the rules. For example, in an example shown in FIG. 5, the document is divided at portions where any one of the following three rules is satisfied: ① /no/, /wa/, /ga/, /ni/, /wo/, or /ya/which are considered as auxiliary words, ② punctuation marks ",", ".", ③ turning points of kinds of characters such as Chinese characters, Katakana, and alphabets. Further, in this stop-word method, it is possible to extract meaningful words to some extent. Further, in case of English, the character string division can be executed to some extent using a method referred to as a "stemming" of dropping conjugation of a word on the basis of rules such as ① space, ② comma, period, punctuation mark, semicolon, and other marks, ③ turning points of kinds of characters, such as alphabets, numerical characters, and symbols.

Figure 6:
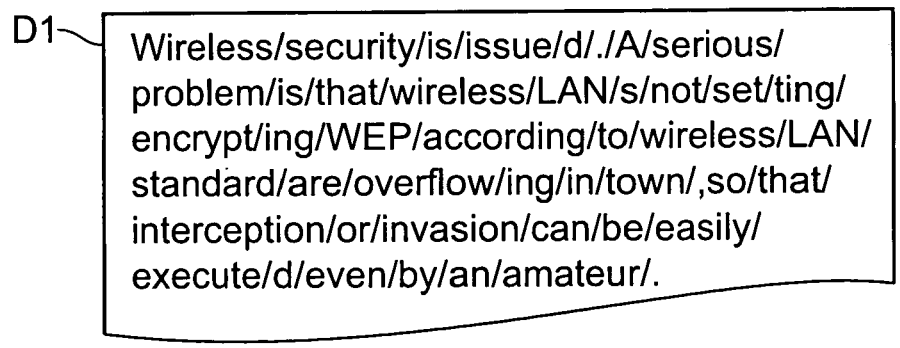
FIG. 6 illustrates a result of the character string division using the morphological analysis.
Figure 7:
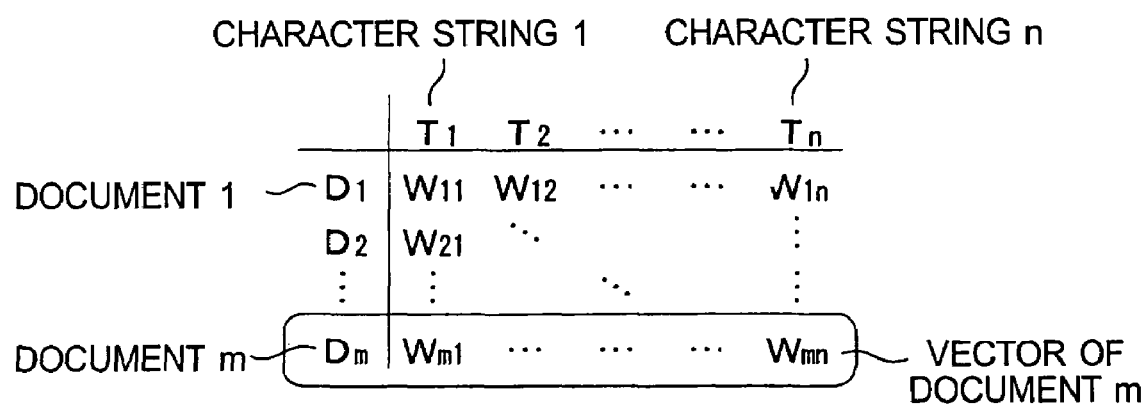
FIG. 7 is a view illustrating a matrix of character string to document.

As described above, when the character string division is completed with regard to all documents $D_1$ to $D_m$ by the character-string-dividing functional unit 18, the character-string frequency computing functional unit 20 computes the frequency of the character strings to prepare a matrix of character string to document as shown in FIG. 7. The matrix of character string to document represents the correspondence between the respective documents $D_1$ to $D_m$ and the unique character strings $T_1$ to $T_n$, and is obtained by counting how may times each of the character strings $T_1$ to $T_n$ appears in each of the documents $D_1$ to $D_m$. For example, when the division is performed using the morphological analysis as a character string division method as shown in FIG. 6, the character string $T_1$, such as [Wireless/security/is/issue/d./A/serious/problem/is/that/wireless/LAN/s/not/set/ting/encrypt/in g/WEP/according/to/wireless/LAN/standard/are/overflow/ing/in/town/, so/that/interception/or/invasion/can/be/easily/execute/d/even/by/an/amateur/.] (hatched character), appears in the document $D_1$ three times, and when the frequency of appearance is used as it is, an element of the matrix corresponding to $W_{11}$ is "3".

Herein, each element of the matrix corresponding to $W_{mn}$ may employ the frequency of appearance of the character string as it is, but it is known that it is possible to generate document vectors well representing features of the documents using a weighting method, such as TFIDF (Term Frequency & Inverse Document Frequency) to reflect degrees of importance of the character strings, which can be utilized in the successive mutual similarity computation.

Figure 8:
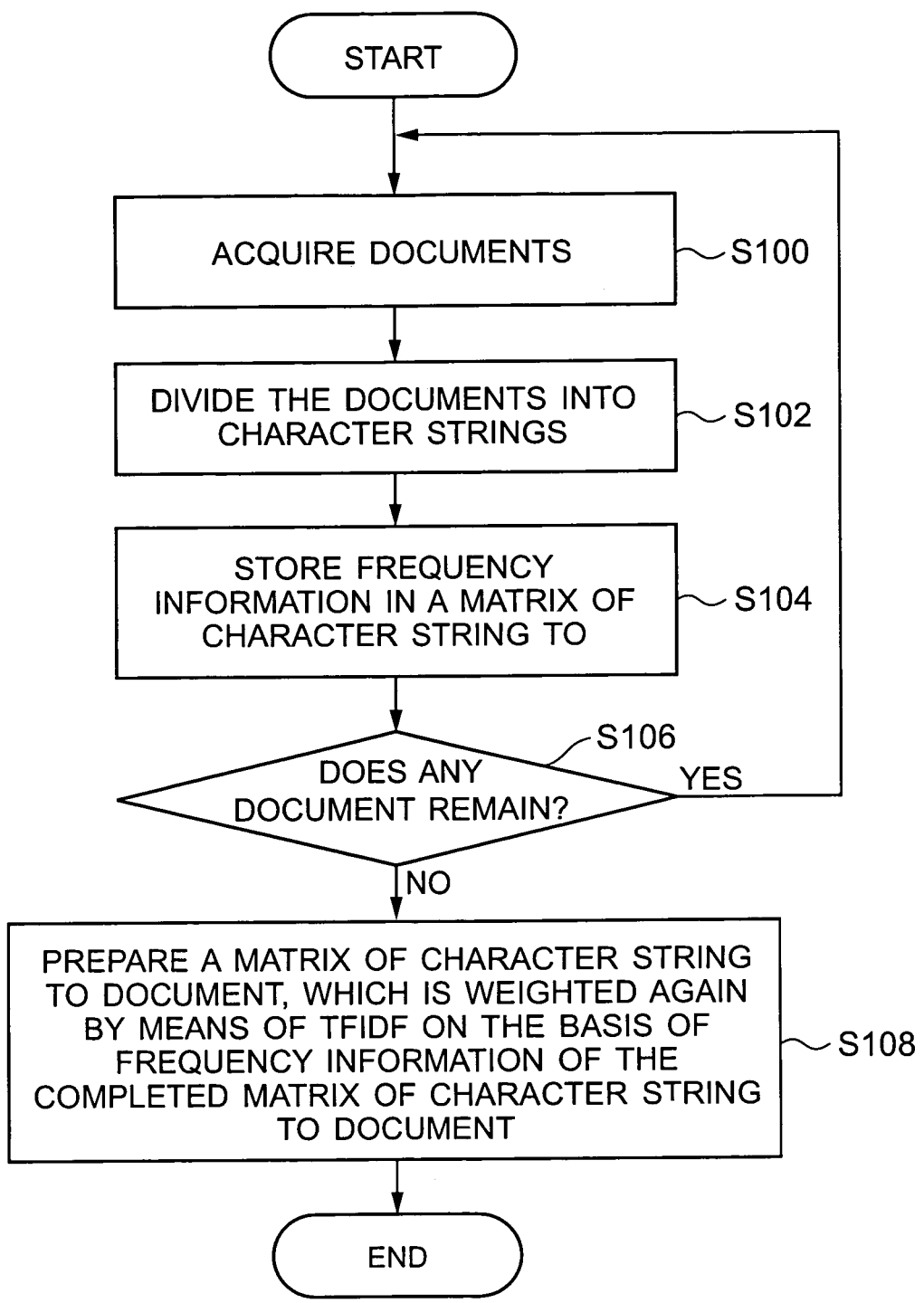
FIG. 8 is a flowchart illustrating a flow to obtain the matrix of character string to document.

That is, the TFIDF is obtained, as represented by Equation 1 below, by product of the frequency of appearance (TF: Term Frequency) of a character string T in any document D and a reciprocal number of the frequency (IDF: Inverse Document Frequency) of the number of documents in which the character string T appears in a whole group of documents, and represents that as its numerical value is bigger, the character string T is more important. The TF is an indicator representing that the frequently appearing character string is important, and has a property of being increased with increase in the frequency of appearance of the character string in any document. The IDF is an indicator representing that the character string appearing in many documents is not important, that is, that the character string appearing in a specific document is important, and has a property of being increased with decrease in the number of documents in which any character string is used. Therefore, since a value of TFIDF is a property of being increased in case of a character string (conjunction or auxiliary word, etc.) frequently appearing and appearing in many documents or a character string appearing only in a specific document and frequently appearing in the specific document, the character strings in a document can be numerically converted by the TFIDF, and thus the document can be made into vectors using the numeral characters as elements.

$$W(t, d) = TF(t, d) \times IDF(t) \quad \text{Equation 1}$$

where TF(t, d)=Frequency at which character string t appears in document d $$IDF(t) = \log\left(\frac{D}{DF(t)}\right)$$

where DF(t)=Frequency of the number of documents in which character string t appears in total documents D=Number of total documents A flowchart shown in FIG. 8 illustrates a flow from the acquisition of documents to the character string computation. As shown in the figure, the documents stored in the information memory device 12 are acquired one by one in step S100, the acquired document is divided into character strings in step S102, frequency information is stored in a matrix of character string to document, which represents the correspondence between documents and character strings in step S104, and then step S106 is performed. In step S106, it is determined whether or not any document stored in the information memory device 12 remains, and when it is determined that any document remains (Yes), the remaining document is acquired to perform the same processes, which are repeated until no document remains.

On the other hand, when it is determined in step S106 that a document stored in the information memory device 12 does not remain (No), step S108 is performed, and a matrix of character string to document, which is weighted again using the TFIDF on the basis of the frequency information of the completed matrix of character string to document, is prepared. Accordingly, all the documents can be expressed as vectors having a dimension (several thousands to several hundred thousands) equal to the number of unique character strings appearing in them.

Figure 9:
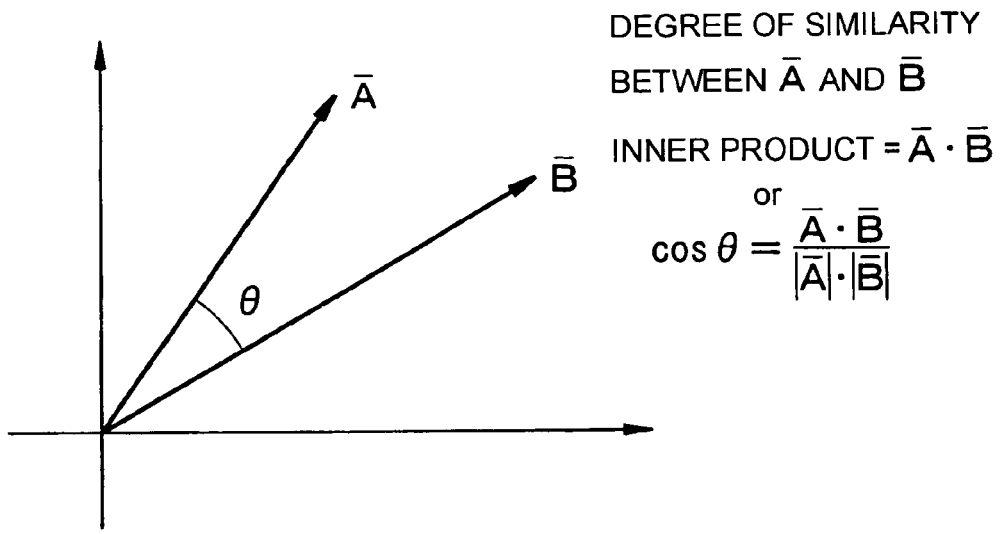
FIG. 9 is a view illustrating document vectors and correlation thereof.
Figure 10:
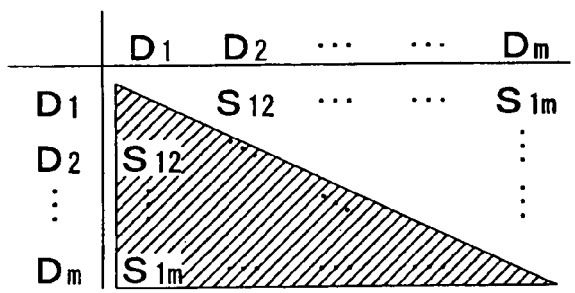
FIG. 10 is a view illustrating a symmetric matrix of document to document.

When all the documents are made into vectors, the degrees of similarity between the documents are computed by the mutual similarity computing functional unit 22. Specifically, the mutual similarity computing functional unit 22 employs a known vector space method, and a degree of mutual similarity is defined using the vector space method for each of the document vectors obtained using the TFIDF. That is, since the degree of similarity between two document vectors to be compared can be defined as a cosine value (0 to 1) of an angle θ formed by two vectors as shown in FIG. 9, the degree of similarity between documents can be expressed as a symmetric matrix shown in FIG. 10.

Figure 11:
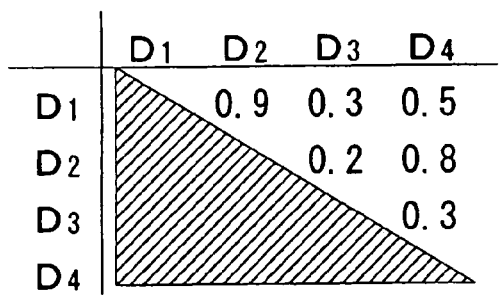
FIG. 11 is a view illustrating a symmetric matrix of document to document.

Thereafter, by grouping or separating similar information segments on the basis of the symmetric matrix, it is possible to realize filtering in which similar documents are excluded. For example, in the symmetric matrix of FIG. 10, the degree of similarity between documents are quantitatively expressed such that the degree of similarity between the document $D_1$ and the document $D_2$ is 0.9, as shown in FIG. 11, and the degree of similarity between the document $D_1$ and the document $D_3$ is 0.3.

Next, when all the degrees of similarity between the documents are quantitatively obtained by the similarity computing device 14, the document extracting device 16 extracts a combination of documents in which the sum of the degrees of similarity between the documents $D_1$ to $D_m$ is the smallest from a group of the documents.

Specifically, the document extracting device 16 extracts r number of documents (determined in accordance with the amount of documents to be delivered or the condition of layout) from all of n number of documents acquired. However, when the r documents are extracted, the document extracting device considers all combinations of documents to select r number of documents from n number of documents as expressed by the following Equation 2, totalize the similarity in each combination, and then extracts a combination whose sum is the smallest.

$$nCr = \frac{n!}{r!(n-r)!} \quad \text{Equation 2}$$

For example, if there are four documents $D_1$, $D_2$, $D_3$, and $D_4$ as documents to be candidates for extraction, combinations to extract three documents from among them are four kinds as expressed by Equation 3.

$$_4C_3 = \frac{4!}{3!(4-3)!} = \frac{4 \times 3 \times 2 \times 1}{(3 \times 2 \times 1) \times (1)} = 4 \quad \text{Equation 3}$$

Then, the degree of similarity between two documents generated in each combination is picked up from a symmetric similarity matrix shown in FIG. 11, and the similarity is simply added up to compute the sum for each of the combinations I, II, III, and IV as shown in Table 1.

TABLE 1

| | |
|---|---|
| I | D1, D2, D3 ⇒ (D1, D2) = 0.9, (D1, D3) = 0.3, (D2, D3) = 0.2 ⇒ 0.9 + 0.3 + 0.2 = 1.4 |
| II | D1, D2, D4 ⇒ (D1, D2) = 0.9, (D1, D4) = 0.5, (D2, D4) = 0.8 ⇒ 0.9 + 0.5 + 0.8 = 2.2 |
| III | D1, D3, D4 ⇒ (D1, D3) = 0.3, (D1, D4) = 0.5, (D3, D4) = 0.3 ⇒ 0.3 + 0.5 + 0.3 = 1.1 |
| IV | D2, D3, D4 ⇒ (D2, D3) = 0.2, (D2, D4) = 0.8, (D3, D4) = 0.3 ⇒ 0.2 + 0.8 + 0.3 = 1.3 |

In the example shown in Table 1, since the sum of the similarity in the combination II ($D_1$, $D_2$, and $D_4$) of four combinations I, II, III, and IV is 2.2 and the largest, and the sum of the degrees of similarity in the combination III ($D_1$, $D_3$, and $D_4$) is 1.1 and the smallest, the documents ($D_1$, $D_3$, and $D_4$) are combined and extracted from among the four documents $D_1$, $D_2$, $D_3$, and $D_4$.

As described above, according to an aspect of the present invention, since a combination of documents having the smallest sum of the degrees of similarity between documents is extracted, the degree of similarity between documents becomes smaller, so that it is possible to considerably decrease likelihood of concurrently extracting documents having similar contents.

As a result, when this is applied to the aforementioned document delivery system, it is possible to avoid the disadvantage of delivering documents having duplicate contents to a user, and troublesome work, such as giving keywords to each document at extraction it is not required, which can considerably contribute to the reduction in cost required for the document extracting process. Furthermore, since the cluster analysis which may increase the amount of computation is not necessary to compute the degrees of similarity between documents, even a poor-capacity computer can execute such functions satisfactorily.

In this exemplary embodiment, although the value generated by simply adding up the degrees of similarity between documents obtained quantitatively has been used as the sum of the degrees of similarity, the sum of squares thereof, the logarithmic sum thereof, etc. may be used other than such simple addition.

However, in this exemplary embodiment, since the degrees of similarity between document vectors are standardized as values ranging from 0 to 1, a non-linear function such the sum of squares or the logarithmic sum is not necessary, and a simple addition thereof is satisfactory.

What is claimed is:

1. A document extracting apparatus, comprising:
   a document acquiring device to acquire a plurality of documents from an information source, according to a user-specific criteria, to be candidates for extraction;
   a similarity computing device to compute all degrees of similarity between the plurality of documents, and express the degrees of similarity in a symmetric matrix,
   the similarity computing device comprising:
      a character-string-dividing functional unit to divide each of the plurality of documents into predetermined character strings;
      a character-string frequency computing functional unit to compute document vectors of the plurality of documents on the basis of a frequency of appearance of the predetermined character strings divided by the character-string-dividing functional unit; and
      a mutual similarity computing functional unit to compute the degrees of similarity between the plurality of documents on the basis of the document vectors obtained from the character-string frequency computing functional unit;
   a combination computing device to compute all combinations of the degrees of similarity computed between the plurality of documents;
   a sum of degrees of similarity computing device to compute, with respect to all of the combinations, a sum of the degrees of similarity between all of the documents that constitute each combination, based on all of the degrees of similarity expressed in the symmetric matrix; and
   a document extracting device to extract documents constituting the combination with the smallest sum of the degrees of similarity among the plurality of documents constituting the respective combinations.

2. The document extracting apparatus according to claim 1,
   the character-string-dividing functional unit dividing each of the plurality of documents into predetermined character strings using any of the following character string division methods: a morphological analysis method, an n-gram method, and a stop-word method.

3. The document extracting apparatus according to claim 1,
   the character-string frequency computing functional unit generating document vectors obtained by weighting each of the plurality of documents by a term frequency and inverse document frequency (TFIDF) weighting method on the basis of a frequency of appearance of the divided character strings.

4. The document extracting apparatus according to claim 1,
   the mutual similarity computing functional unit computing degrees of similarity between the plurality of documents by a vector space method on the basis of the document vectors of the plurality of documents.

5. A computer-readable media having a document extracting program allowing a computer to serve as:
a document acquiring device to acquire a plurality of documents from an information source, according to a user-specific criteria, to be candidates for extraction;
a similarity computing device to compute all degrees of similarity between the plurality of documents, and express the degrees of similarity in a symmetric matrix, the similarity computing device comprising:
  a character-string-dividing function to divide each of the plurality of documents into predetermined character strings;
  a character-string frequency computing function to compute document vectors of the plurality of documents on the basis of a frequency of appearance of the predetermined character strings divided by the character-string-dividing function; and
  a mutual similarity computing function to compute the degrees of similarity between the plurality of documents on the basis of the document vectors obtained by the character-string frequency computing function;
a combination computing device to compute all combinations of the degrees of similarity computed between the plurality of documents;
a sum of degrees of similarity computing device to compute, with respect to all of the combinations, a sum of the degrees of similarity between all of the documents that constitute each combination, based on all of the degrees of similarity expressed in the symmetric matrix; and
a document extracting device to extract documents constituting the combination with the smallest sum of the degrees of similarity among the plurality of documents constituting the respective combinations.

6. A computer-readable media having a document extracting program allowing a computer to serve as:
a document acquiring device to acquire a plurality of documents from an information source, according to a user-specific criteria, to be candidates for extraction;
a similarity computing device to compute all degrees of similarity between the plurality of documents, and express the degrees of similarity in a symmetric matrix, the similarity computing device comprising:
  a character-string-dividing function to divide each of the plurality of documents into character strings using any one of character string division methods;
  a character-string frequency computing function to generate document vectors obtained by weighting each of the documents by a term frequency and inverse document frequency (TFIDF) weighting method on the basis of a frequency of appearance of the divided character strings; and
  a mutual similarity computing function to compute the degrees of similarity between the plurality of documents by a vector space method on the basis of the document vectors of the plurality of documents,
a combination computing device to compute all combinations of the degrees of similarity computed between the plurality of documents;
a sum of degrees of similarity computing device to compute, with respect to all of the combinations, a sum of the degrees of similarity between all of the documents that constitute each combination, based on all of the degrees of similarity expressed in the symmetric matrix; and
a document extracting device to extract documents constituting the combination with the smallest sum of the degrees of similarity among the plurality of documents constituting the respective combinations.

7. A document extracting method, comprising:
acquiring a plurality of documents from an information source, according to a user-specific criteria, to be candidates for extraction;
dividing each of the documents into predetermined character strings, computing a frequency of appearance of the divided character strings, computing document vectors of the plurality of documents on the basis of the frequency of appearance of the predetermined character strings, and computing the degrees of similarity between the plurality of documents using the document vectors;
expressing the degrees of similarity in a symmetric matrix;
computing all combinations of the degrees of similarity computed between the plurality of documents;
computing, with respect to all of the combinations, a sum of the degrees of similarity between all of the documents that constitute each combination, based on all of the degrees of similarity expressed in the symmetric matrix; and
extracting documents constituting the combination with the smallest sum of the degrees of similarity among the plurality of documents constituting the respective combinations.

8. A document extracting method, comprising:
acquiring a plurality of documents from an information source, according to a user-specific criteria, to be candidates for extraction;
dividing each of the plurality of documents into predetermined character strings using any one of character string division methods, including a morphological analysis method, an n-gram method, and a stop-word method, computing document vectors of the plurality of documents by weighting each of the documents by a term frequency and inverse document frequency (TFIDF) weighting method on the basis of a frequency of appearance of the divided predetermined character string, and computing the degrees of similarity between the plurality of documents using a vector space method on the basis of the document vectors;
computing all degrees of similarity between the plurality of documents, and expressing the degrees of similarity in a symmetric matrix;
computing all combinations of the degrees of similarity computed between the plurality of documents;
computing, with respect to all of the combinations, a sum of the degrees of similarity between all of the documents that constitute each combination, based on all of the degrees of similarity expressed in the symmetric matrix; and
extracting documents constituting the combination with the smallest sum of the degrees of similarity among the plurality of documents constituting the respective combinations.

* * * * *